(12) United States Patent
Szentimrey et al.

(10) Patent No.: US 9,975,464 B2
(45) Date of Patent: May 22, 2018

(54) APPARATUS FOR DISCHARGE OF BULK MATERIALS

(71) Applicant: CAN AMERICAN STONE SPREADER SALES LTD., St. Catharines, Ontario (CA)

(72) Inventors: Mark Szentimrey, Branchton (CA); Glenn Sinke, St. Catharines (CA)

(73) Assignee: CAN AMERICAN STONE SPREADER SALES LTD., Ontario (CA)

( * ) Notice: Subject to any disclaimer, the term of this patent is extended or adjusted under 35 U.S.C. 154(b) by 0 days. days.

(21) Appl. No.: 15/329,686

(22) PCT Filed: Jul. 24, 2015

(86) PCT No.: PCT/CA2015/050700
§ 371 (c)(1),
(2) Date: Jan. 27, 2017

(87) PCT Pub. No.: WO2016/015144
PCT Pub. Date: Feb. 4, 2016

(65) Prior Publication Data
US 2017/0225600 A1 Aug. 10, 2017

(30) Foreign Application Priority Data
Jul. 28, 2014 (CA) ..................... 2857903

(51) Int. Cl.
*B60P 1/36* (2006.01)
*B60P 1/16* (2006.01)
*B60P 1/28* (2006.01)

(52) U.S. Cl.
CPC ............. *B60P 1/36* (2013.01); *B60P 1/162* (2013.01); *B60P 1/286* (2013.01)

(58) Field of Classification Search
CPC ...... B60P 1/36; B60P 1/38; E01C 2019/2075; E01C 2019/2095; B65G 15/16; B65G 2814/032; B65G 41/005
(Continued)

(56) References Cited

U.S. PATENT DOCUMENTS 2,466,923 A * 4/1949 Woodard .................. B60P 1/36
414/502
3,228,663 A 1/1966 Travis
(Continued)

FOREIGN PATENT DOCUMENTS

GB 865097 A 4/1961

OTHER PUBLICATIONS

International Search Report and Written Opinion prepared by the Canadian Intellectual Property Office dated Nov. 10, 2015, for International Application No. PCT/CA2015/050700.

*Primary Examiner* — Mark C Hageman
(74) *Attorney, Agent, or Firm* — Sheridan Ross PC

(57) ABSTRACT

The present invention relates to a system for transporting and discharging material from vehicles and trailers having a material hopper body. The material hopper body has generally inclined sidewalls and a substantially horizontal bottom area defined by an internal conveyor extending the length of the hopper body. A tailgate door closes the end of the hopper body to contain the load in the hopper. The tailgate door is moveable from the closed position to an open position to permit discharge of the material out the rear of the hopper. Lift and stabilizing means proximate the rear of the material hopper body elevate the hopper body. An external throw conveyor is adapted to pivot between a stored position at the side of the hopper body to an operational position behind and below the hopper body at the discharge end to directionally discharge material from the hopper body.

36 Claims, 14 Drawing Sheets

(58) Field of Classification Search
USPC .......................................................... 414/489
See application file for complete search history.

(56) References Cited

U.S. PATENT DOCUMENTS

| | | |
|---|---|---|
| 4,576,538 A | 3/1986 | Theurer et al. |
| 5,364,221 A * | 11/1994 | Theurer .................. B61D 3/16 |
| | | 104/2 |
| 6,007,272 A * | 12/1999 | Macku ................ E01C 19/1077 |
| | | 366/319 |
| 6,146,080 A | 11/2000 | Sinke |
| 6,305,896 B1 | 10/2001 | Szentimrey |
| 6,386,818 B1 | 5/2002 | Reed |

* cited by examiner

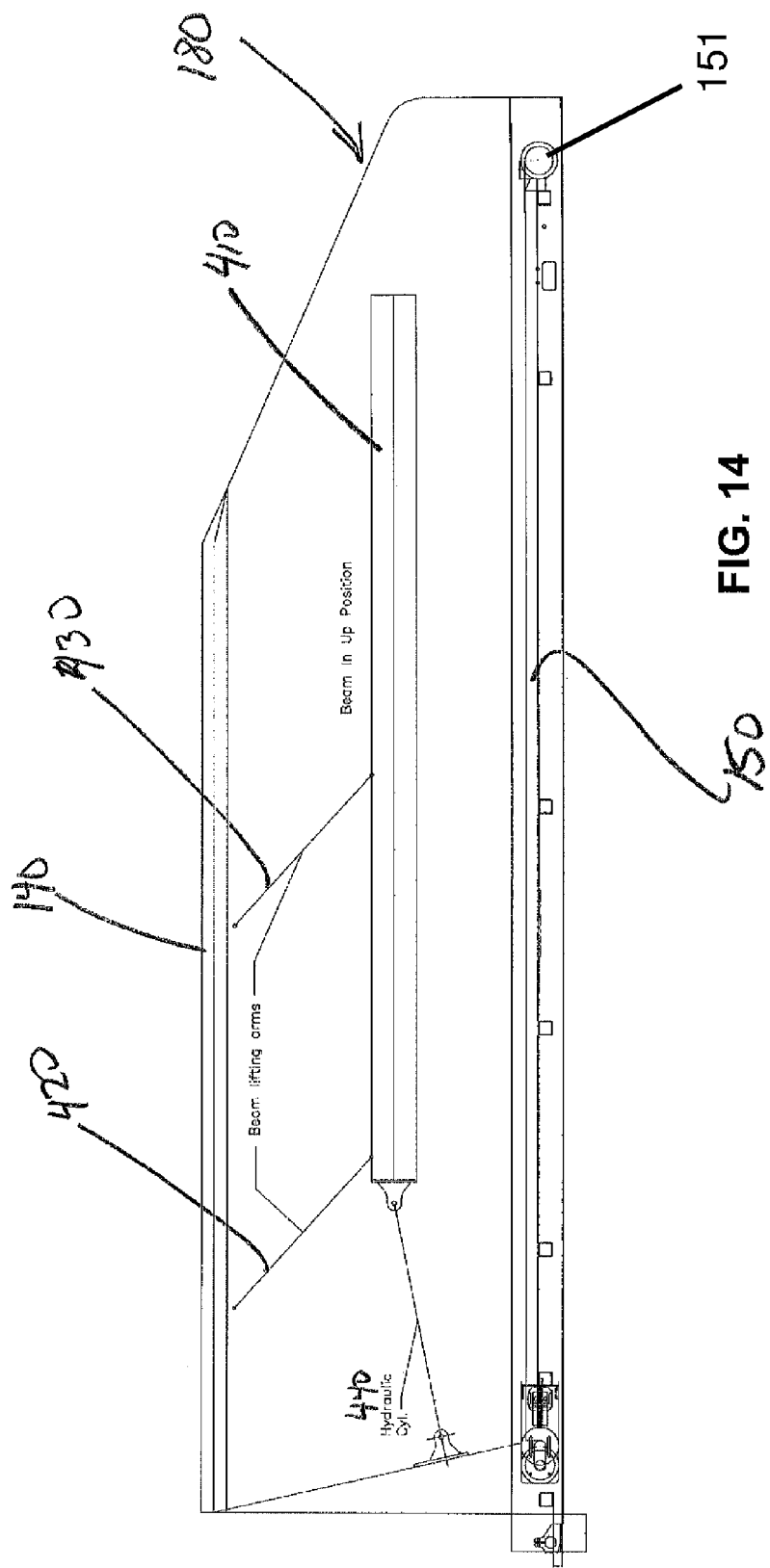

APPARATUS FOR DISCHARGE OF BULK MATERIALS

CROSS REFERENCE TO RELATED APPLICATIONS

This application is a national stage application under 35 U.S.C. 371 and claims the benefit of PCT Application No. PCT/CA2015/050700 having an international filing date of 24 Jul. 2015, which designated the United States, which PCT application claimed the benefit of Canada Patent Application No. 2857903 filed 28 Jul. 2014, the disclosure of each of which are incorporated herein by reference.

TECHNICAL FIELD

This disclosure relates to a system for transporting and discharging material from vehicles and trailers having a material hopper body with a live bottom or endless internal conveyor and an external conveyor arrangement and more particularly to vehicles and live bottom trailers having a material hopper body capable of being elevated adjacent the discharge end of the hopper body.

BACKGROUND

There are various material transport vehicles and trailers used to transport different loads such as soil, mulch, sand, gravel, screening materials, and other aggregates, organics such as mulch, feedstuffs for livestock, and agricultural products. These include dump trucks, slinger trucks, live bottom trucks, and live bottom trailers.

Traditional live bottom trailers generally have larger capacities than dump trucks and slinger trucks. Available live bottom trailers provide load capacities from 25 cubic yards (19.11 cubic meters) to as high as 50 cubic yards (38.23 cubic meters). Live bottom trailers have substantially horizontal hopper body bottoms. Typically, one or more tailgate doors of the hopper body open and an internal conveyor disposed at the bottom the trailer/hopper body discharges its load out the rear of the hopper body onto the ground behind the trailer. Unlike a dump truck, a live bottom trailer is not hoisted or vertically elevated when discharging material from the rear of the trailer.

Most live bottom trailers do not use throw conveyor systems because their hopper body is too low to provide a throw conveyor with adequate clearance from the ground. Some attempts have been made to include a throw conveyor with a live bottom trailer to discharge the material somewhat further. Because of the lower ground clearance of a live bottom trailer a throw conveyor cannot be easily configured to move to a stored position beside the hopper. Accordingly, throw conveyors have been configured to move to a vertical stored position adjacent the trailer's rear discharge doors. This storage position limits the length of the throw conveyor which in turn limits material discharge distances. Accordingly, the use of live bottom trailers is generally limited to readily accessible site locations and uses which do not require distant, directional discharge of material.

Slinger trucks are used to directionally discharge material greater distances. A traditional slinger truck has a hopper like body with an internal conveyor along the length of the hopper bottom and an external throw conveyor for receiving discharging material from the internal conveyor and projecting the material significant distances to desired throw or drop locations. The throw conveyor typically pivots from a travel storage position beside the hopper body to an end discharge position in alignment with the internal conveyor. The throw conveyor can move horizontally and vertically to direct the discharging material. The bottom of the hopper body of a slinger truck is configured differently than a traditional live bottom trailer. The hopper body has an inclined bottom wherein the hopper bottom is lowest at the front end (closest the vehicle cab) and highest at the discharge end. This inclined configuration is required so that the external throw conveyor can be pivoted and positioned under the discharge end of the internal conveyor at optimum angles for distant discharge of the material. The hopper body of a slinger does not elevate vertically in the manner of a dump truck. Whilst a slinger truck can discharge material directionally and for greater distances than live bottom trailers, the inclined hopper body limits the load capacity of slinger truck and raises the center of gravity of the load. A higher centre of gravity may cause instability of a loaded truck. Different slinger truck hopper body lengths provide load capacities from about 18 cubic yards (13.76 cubic meters) to about 22 cubic yards (16.82 cubic meters).

It is desirable to have a vehicle with the versatility of delivering a large payload like a live bottom trailer and with the capability of discharging the payload like a slinger truck.

It is desirable to bring the load mass effective height of a live bottom hopper body closer to the ground surface whilst also increasing the volume of the hopper body. It is also desirable to lower the overall height of the unit to allow access to site areas that are traditionally more difficult to get to by slinger trucks and to be able to unload in the same time and manner as a traditional slinger truck using a throw conveyor.

It is desirable to maintain a maximum amount of ground clearance for a throw conveyor due to the nature of the locations where material is offloaded. Sufficient ground clearance is required to discharge and direct the offloaded material substantial distances. It may also be desirable to use standard configurations of throw conveyors.

Some material such as top-soil tends to compact or clump in a hopper body and adhere to the hopper body during transport. In such instances, discharging the material quickly and completely becomes challenging because during the discharge operation the material does not easily move to the hopper bottom onto the internal conveyor. Known metering beams utilize hydraulic cylinders with pulley's and cable to elevate and lower the beam. It is desirable to have a discharge system that has the capability of discharging large loads for all types of materials and to simplify the operation of metering beams.

SUMMARY OF THE INVENTION

The present disclosure provides a versatile material transport vehicle operable resembling a live bottom trailer or a slinger truck.

According to one aspect of the invention, a vehicle for transporting and unloading material comprises a chassis and a material hopper body coupled to the chassis. The material hopper body is configured to lift proximate a discharge end of the hopper body. A first endless conveyor is disposed adjacent a bottom of the material hopper body and configured with one or more propulsion means. A second endless conveyor having one or more propulsion means is provided. The second conveyor is pivotally mounted to the chassis about a substantially vertical axis and is configured to align with the discharge end of the first conveyor. The discharge end of the second conveyor may be elevated to an incline.

In another aspect of the invention, a material transport apparatus adapted to be mobilized by a vehicle for transporting material, comprises a material hopper body coupled to a chassis supported by wheels such that the material hopper body is adapted to be mobile. The material hopper body includes means for elevating the material hopper body, proximate a discharge end of the hopper body. A first endless conveyor is disposed adjacent a bottom of the material hopper body and is configured with one or more propulsion means. A second endless conveyor having one or more propulsion means is provided. The second conveyor is pivotally mounted to the chassis about a substantially vertical axis and is configured to align with the discharge end of the first conveyor. The discharge end of the second conveyor may be elevated to an incline.

In a further aspect of the invention, a system for discharging material from a vehicle, comprises a material hopper body coupled to the vehicle. The material hopper body is configured to lift adjacent a discharge end of the hopper body. A first endless conveyor is disposed adjacent a bottom of said material hopper body and is configured with one or more propulsion means. A second endless conveyor having one or more propulsion means is provided. The second conveyor is pivotally mounted to the chassis about a substantially vertical axis and is configured to align with a discharge end of the first conveyor. including means for elevating a discharge end of the second conveyor.

In a still further aspect of the invention, a system for discharging material from a vehicle, comprises a material hopper body coupled to the vehicle and configured to lift adjacent a discharge end of the hopper body, a first endless conveyor adjacent a bottom of said material hopper body and configured with one or more propulsion means, a second endless conveyor having one or more propulsion means, said conveyor pivotally mounted to the chassis about a substantially vertical axis and configured to align with a discharge end of the first conveyor. The discharge end of the second conveyor may be elevated to an incline.

In another aspect of the invention, an apparatus for transporting and discharging material from a vehicle, comprises a chassis and a material hopper body coupled to the chassis. The material hopper body includes a pair of opposing sidewalls converging downwardly and inwardly and extending from a front wall toward a discharge area to define a bottom longitudinal output area. A tailgate door adjacent the discharge area is provided. The material hopper body has an open top defined generally between the front, discharge area, sidewalls and tailgate. One or more actuators operatively connected to the material hopper body and the chassis elevate the material hopper body proximate a discharge end of the hopper body. One or more stabilizer members are provided proximate a discharge end of the material hopper body. They are adapted to extend between an underside of material hopper body and to the chassis. A first endless conveyor is positioned generally at the bottom longitudinal output area of the material hopper body and is operative to convey material from the material hopper body toward a discharge area. A second endless conveyor operative to convey material received from the first conveyor is provided. The second conveyor is pivotally mounted to the chassis about a substantially vertical axis and is configured to align with a discharge end of the first conveyor. The discharge end of the second conveyor may be elevated to an incline. A metering beam extends longitudinally within the material hopper body above the first conveyor. Means for elevating the metering beam from a first position proximate said first conveyor, to a second position away from said first conveyor are provided. The elevating means have an actuator acting between the metering beam and the material hopper body, proximate a first end of said metering beam. The elevating means includes a first pair of support arms suspended from the material hopper body and pivotally mounted proximate a first end and a second pair of support arms suspended from the material hopper body and pivotally mounted proximate a second end of the metering beam.

In another aspect of the invention, a method of discharging material from the rear end of a live bottom material transport apparatus wherein the transport apparatus comprises a chassis supporting a material hopper body carrying loose material and supported on wheels such that the material hopper body is adapted to be mobile. The material hopper body includes one or more first actuators operatively connected to the material hopper body and the chassis for elevating the material hopper body proximate a discharge end of the hopper body. One or more stabilizer members are disposed proximate a discharge end of the material hopper body and are operatively connected to the material hopper body and to the chassis. A first endless conveyor positioned generally at a bottom longitudinal output area of the material hopper body is operative to convey material from the material hopper body toward a discharge area. A tailgate door is disposed adjacent the discharge area. A second endless conveyor is operative to convey material received from the first conveyor. The second conveyor is pivotally mounted to the chassis about a substantially vertical axis and is configured to align with and under a discharge end of the first conveyor. The discharge end of the second conveyor may be elevated to an incline. A metering beam extends longitudinally within the material hopper body above the first conveyor. Means for elevating the metering beam from a first position proximate said first conveyor, to a second position away from said first conveyor are provided. The elevating means have an actuator acting between the metering beam and the material hopper body, proximate a first end of said metering beam. The elevating means includes a first pair of support arms suspended from the material hopper body and pivotally mounted proximate a first end and a second pair of support arms suspended from the material hopper body and pivotally mounted proximate a second end of the metering beam. The method comprises elevating the material hopper body, pivoting the second conveyor from a stored position beside the apparatus to an operational position rearward the apparatus The second conveyor is aligned with a receiving end of the second conveyor under a discharge end of the first conveyor. The tailgate door is opened. The first conveyor is activated to discharge material rearward through the discharge opening. The second conveyor is activated to directionally discharge material rearward of the apparatus.

BRIEF DESCRIPTION OF THE DRAWINGS

The present invention may be further understood by reference to the description of the embodiments, taken in conjunction with the accompanying drawings, in which:

FIG. 14 is a schematic drawing showing a cross sectional view of the hopper body with the metering beam in an up position.

DESCRIPTION

Figure 1:
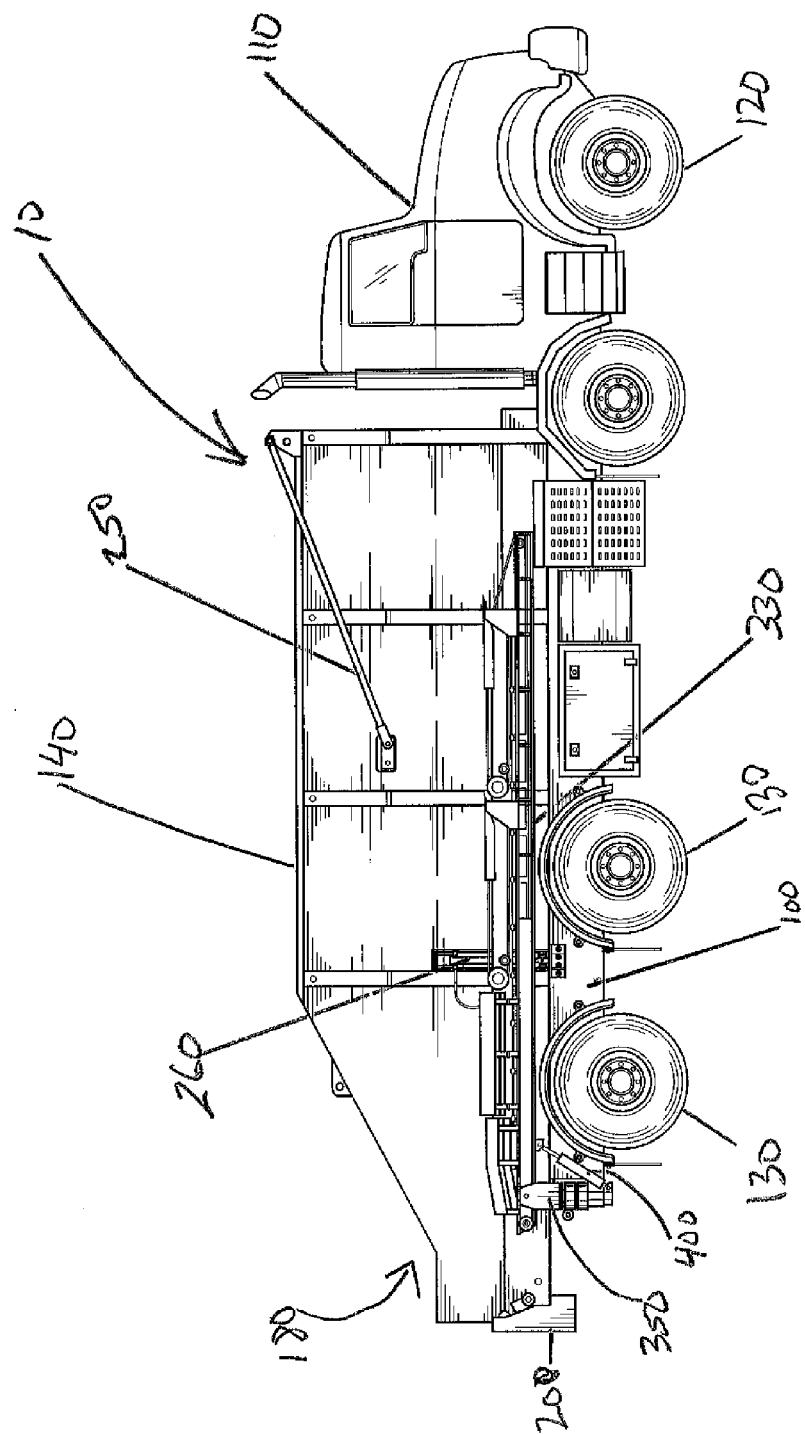
FIG. 1 is a side view of a material transport vehicle with a throw conveyor shown in the stored position, according to an embodiment of the invention.
Figure 2:
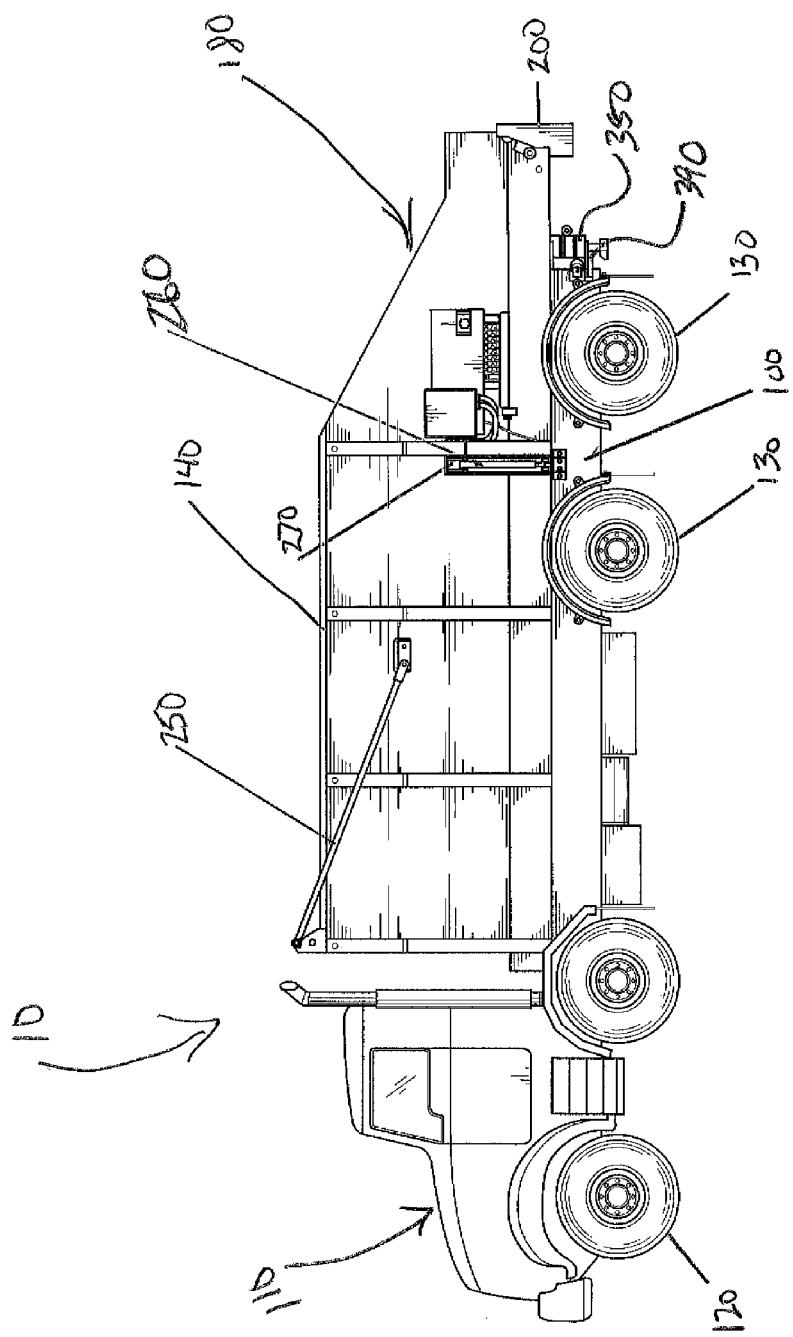
FIG. 2 is a side view of the opposite side of the vehicle shown in FIG. 1.
Figure 3:
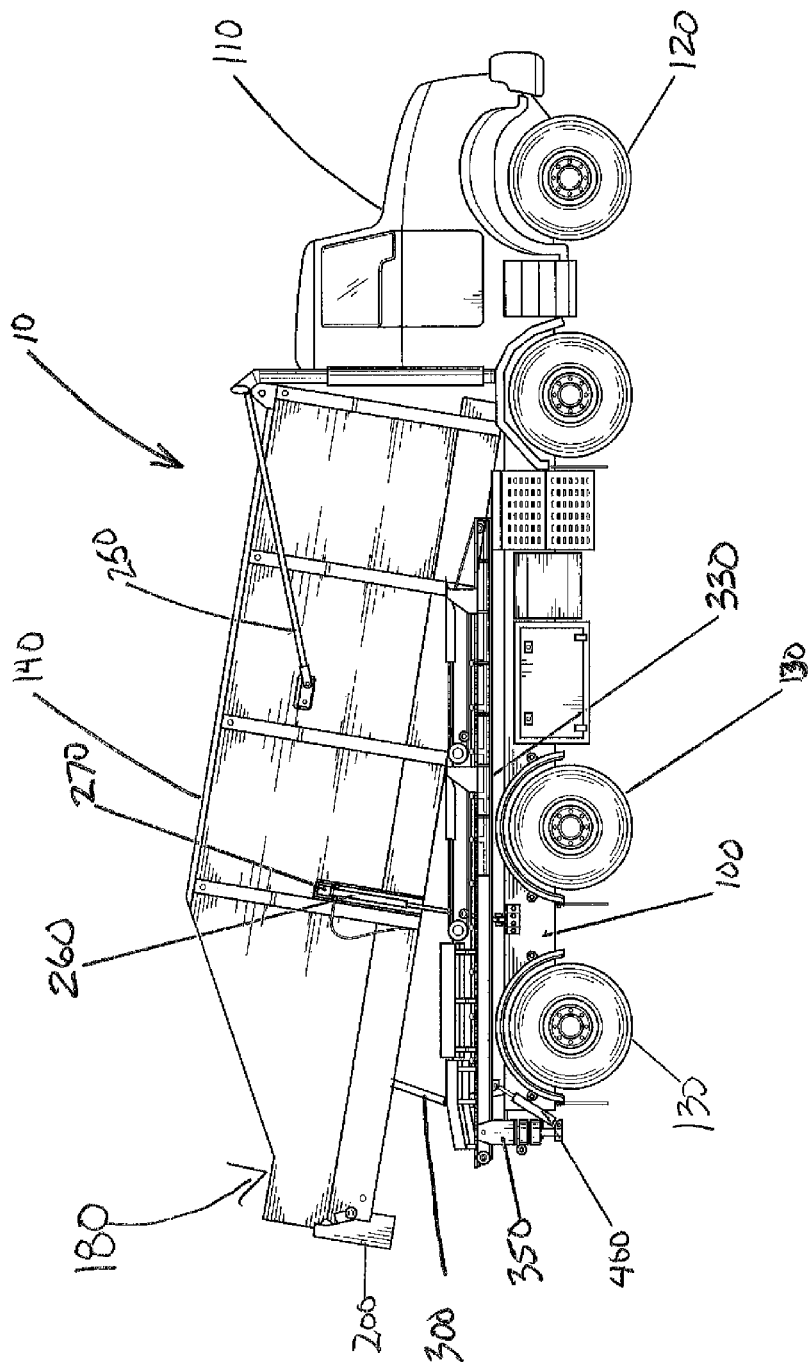
FIG. 3 is a rear side view of the vehicle with the hopper body raised and a throw conveyor in the stored position.
Figure 4:
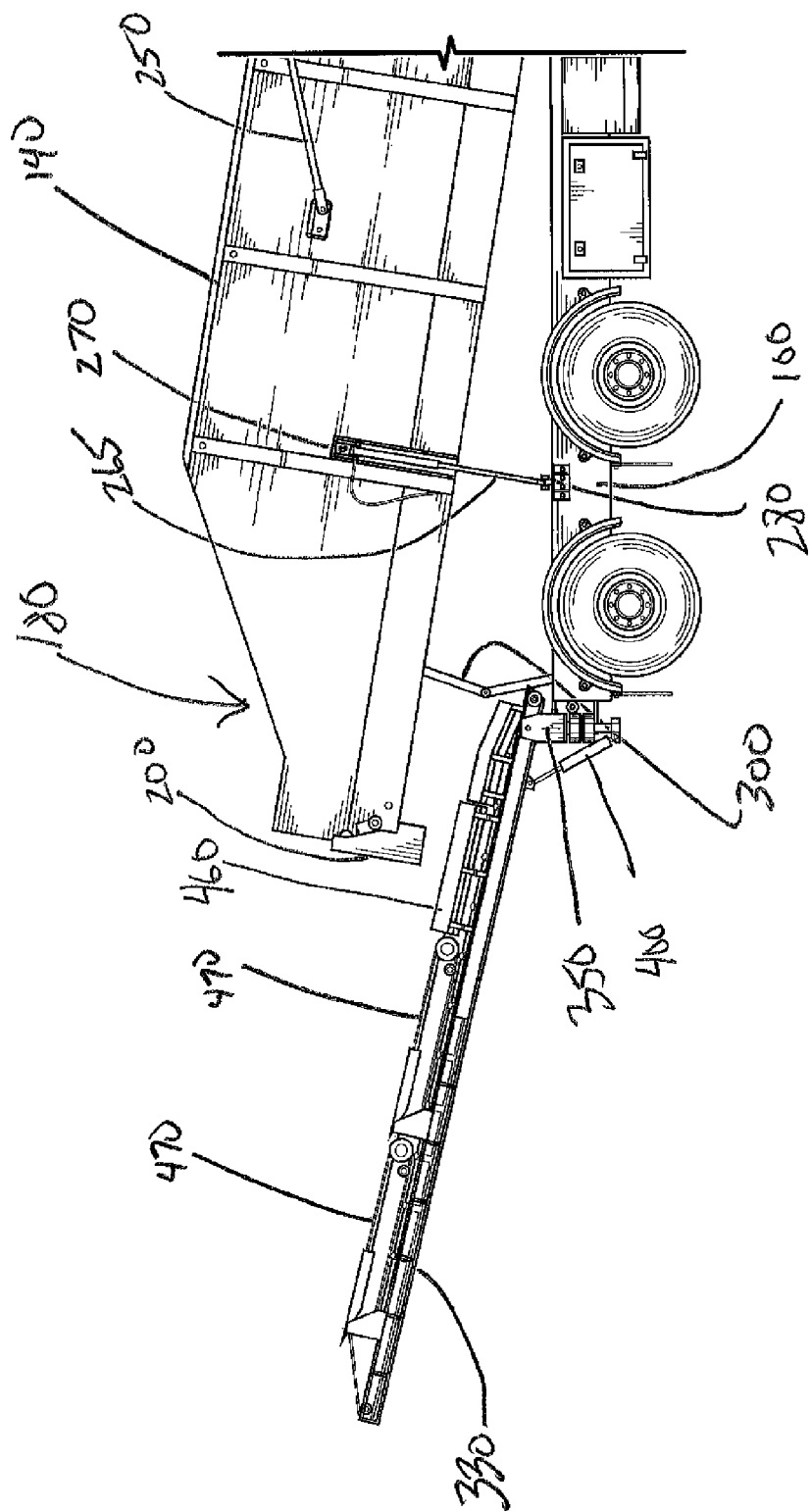
FIG. 4 is side view of the rear part of the vehicle with the hopper body raised and a throw conveyor in an operational position.
Figure 5:
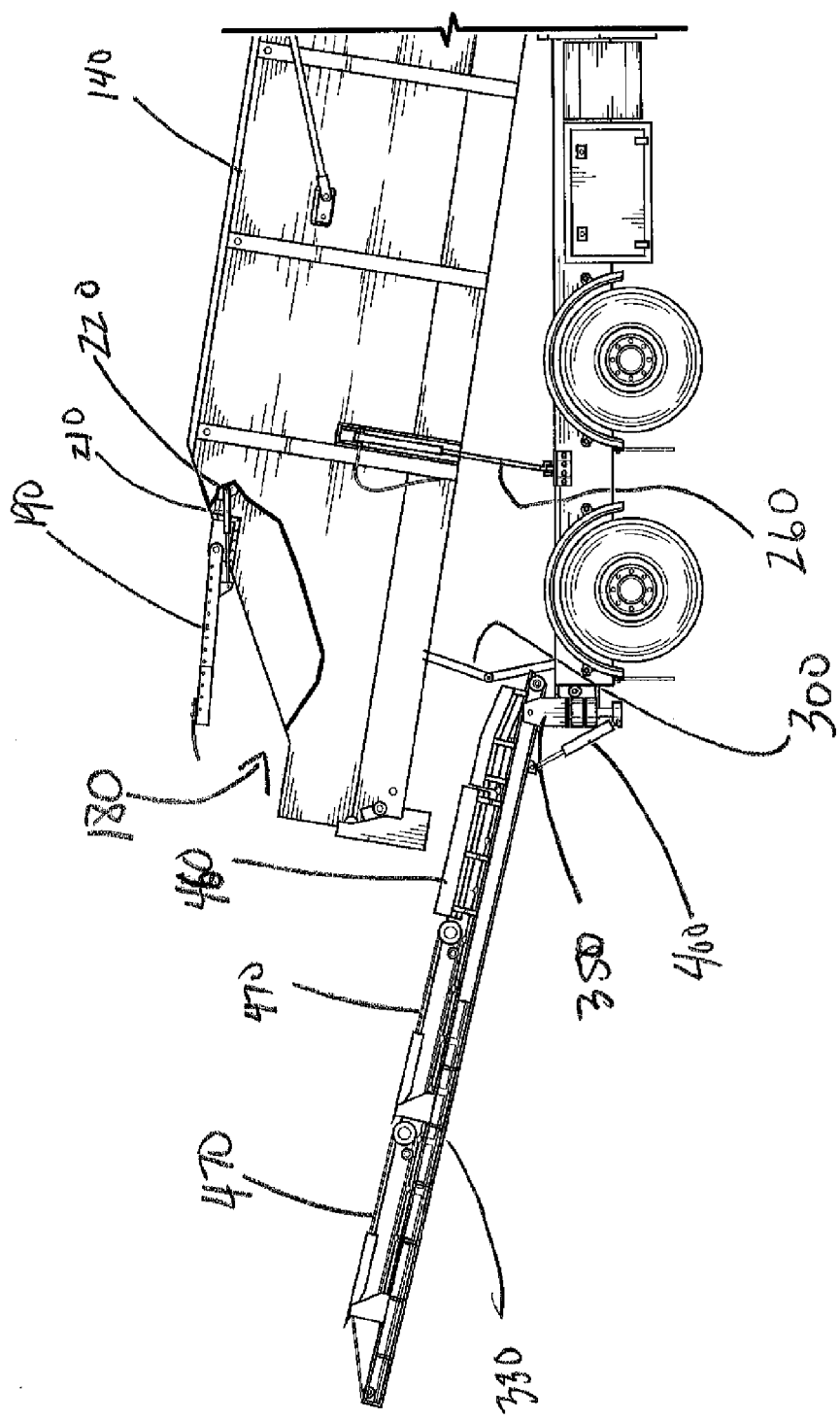
FIG. 5 is side view of the rear part of the vehicle with the hopper body raised, the throw conveyor in an operational position and the end or tailgate door of the hopper in an open position.
Figure 6:
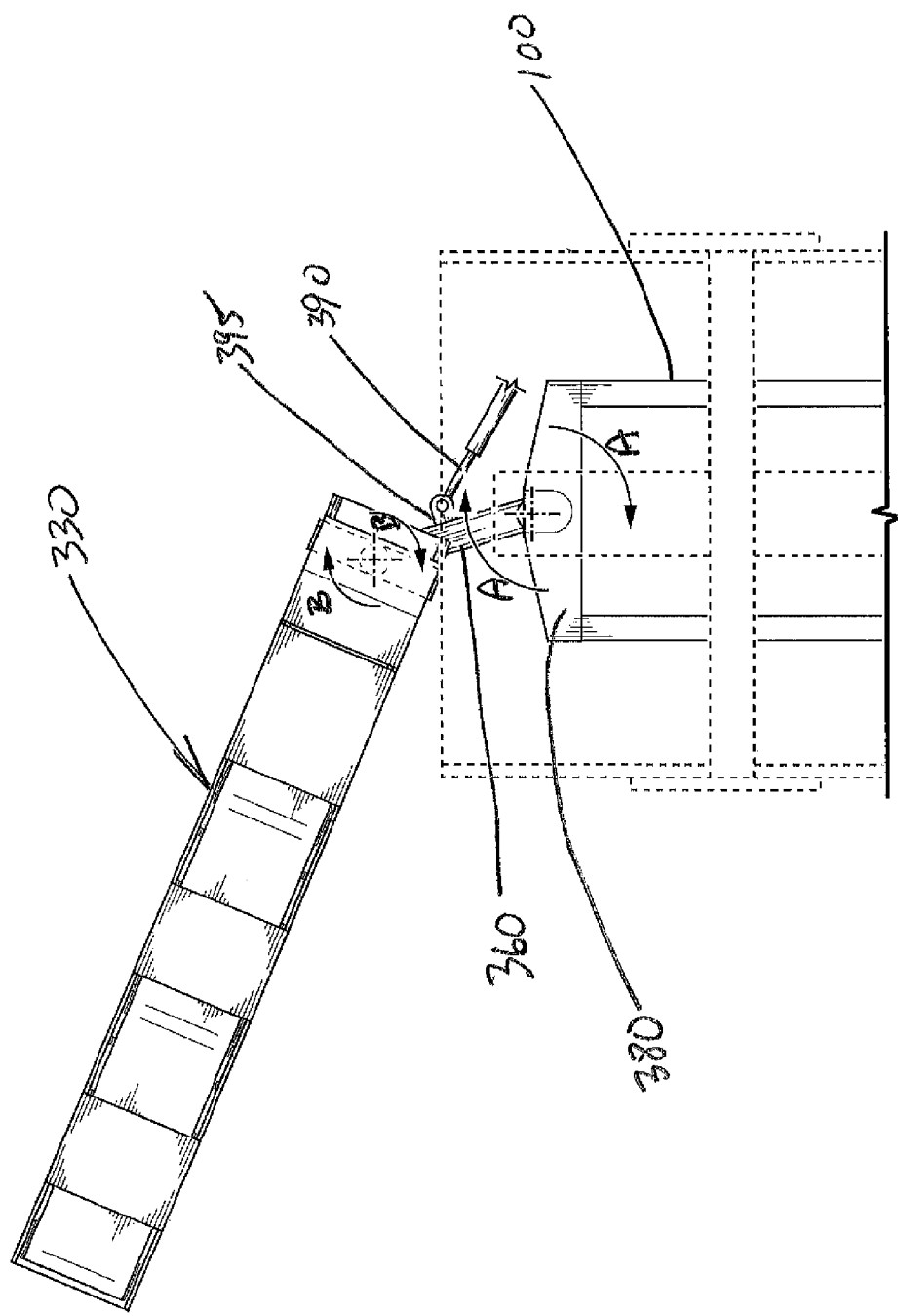
FIG. 6 is a top view of the throw conveyor connection to the vehicle frame/body.
Figure 7:
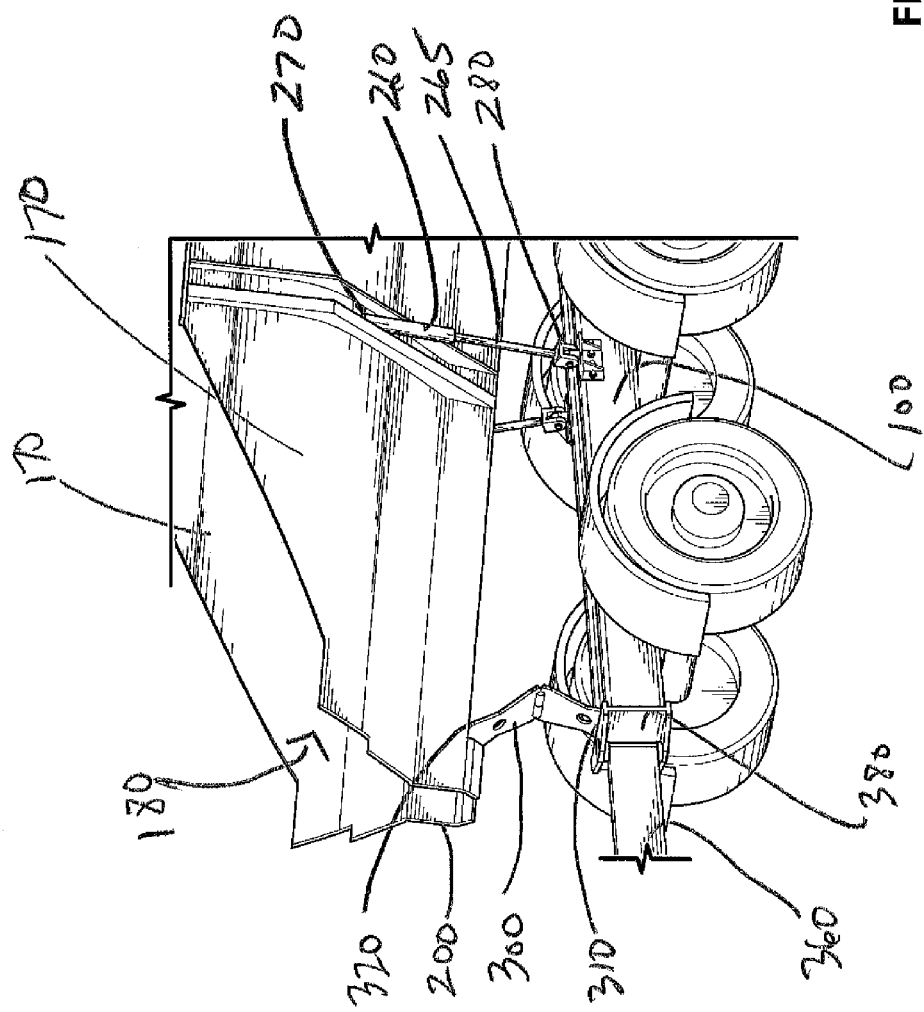
FIG. 7 is an enlarged end side view of the vehicle with the hopper raised.

The description, which follows, and the embodiments described therein, are provided by way of illustration of an example, or examples of particular embodiments of principles and aspects of the present invention. These examples are provided for the purposes of explanation, and not of limitation, of those principles and of the invention. In the description that follows, like parts are marked throughout the specification and the drawings with the same respective reference numerals. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIGS. 1 through 14, illustrate a material transport vehicle provided with a moveable live bottom material hopper body configuration and throw conveyor of one embodiment of the invention.

In one embodiment and referring to FIGS. 1, 2, 3, 8, and 9 a transport vehicle 10 includes a chassis or frame 100 supporting the cab 110 for the motor and driver, a pair of forward steering wheels 120 and one or more tandem set of rear drive wheels 130. The vehicle chassis may be selected from any one of available heavy specification truck chassis offered by makers of MACK™, VOLVO™, PETERBILT™, KENWORTH™, INTERNATIONAL™ and FREIGHTLINER™ trucks. In an exemplary embodiment the chassis 100 includes a twenty thousand pound front axle and a forty-six thousand pound rear axle. The vehicle includes a material hopper body 140 (sometimes referred hereinafter as hopper body) having an open top into which material is loaded and a bottom longitudinal output area in which a horizontally disposed conveyor 150 having the preferred form of an endless conveyor is disposed. The hopper body 140 is preferably constructed of HARDOX™ 450 steel plates. HARDOX™ 450 plates provide an advantageous combination of hardness and durability over normal steel plates that allow thinner plates to be used. Hardness keeps the structure in shape, while toughness makes a structure more resilient to sudden shocks, jolts and bangs. HARDOX™ 450's high yield strength results in a lighter structure for use in the extreme performance environments of material transport vehicles. The conveyor 150 preferably extends the length of the hopper body. The conveyor 150 is driven by one or more propulsion means (such as motor 151 shown in FIGS. 13-14) to drive and regulate the conveyor speed. Different propulsion means are known in the art and include but are not limited to one or more chain drives, electric drive motors, and direct hydraulic motors. The material hopper body 140 includes a substantially vertical front wall 160 and a pair of opposing sidewalls 170 converging downwardly and inwardly to define a longitudinal output area. Sidewalls 170 extend horizontally rearward from the front wall 160 to a discharge area generally indicated at 180 where material is discharged from the hopper body 140. A tailgate door 190 closes the discharge area 180 of the hopper body 140 to contain material in the hopper body. In an exemplary embodiment the material hopper body provides a load capacity of about 30 cubic yards (22.94 cubic meters). A chute 200 comprised of two sections extends downward from each sidewall 170 adjacent the discharge end of conveyor 150. The chute 200 directs and controls the egress of material from the conveyor 150. Tailgate door 190 includes an upper hinge means to permit opening and closing the tailgate door 190. A hydraulic cylinder 210 is mounted at the top ends of tailgate door 190 adjacent sidewalls 170. One end 220 of each hydraulic cylinder 210 is mounted to a sidewall 170 of the hopper body 140 and the other end 230 is mounted to the tailgate door. In operation, extending and retracting hydraulic cylinder rods 215 moves the tailgate door between a closed position during transport and an open position for material discharge out the rear of the hopper body 140. The sidewalls 170 of hopper body 140 are inclined sufficient so that material generally does not stick to the sidewalls but instead slides downward toward the conveyor. Once material is loaded into the hopper body 140 a flexible cover 240 may be used to cover the material hopper body top 140 from the front wall 160 to the tailgate door 190. One end of the flexible cover 240 is wound around a first rod 245 configured across the width of the hopper body 140 and affixed at each end to sidewalls 170 near the front wall 160. The opposite end of flexible cover 240 is partially wound around second rod 246. The second rod 246 is connected at each end to an arm 250 extending downwardly adjacent the exterior of each sidewall 170. The arms 250 are pivotally connected to the sidewalls 170. As the arms 250 rotate about their pivot points on the sidewalls 170, the second rod 246 unwinds the rolled flexible cover 240 from the first rod 245.

As shown in FIGS. 1, 2, 3, 4, 5, and 7, the hopper body 140 is arranged to lift adjacent its discharge end. Two hydraulic cylinders 260 are disposed on opposite sides of the hopper body 140 to synchronously elevate and lower the hopper body 140. Each hydraulic cylinder 260 is coupled at one end 270 to the exterior of sidewall 170 and at the opposite end 280 is coupled to the chassis 100. A stabilizer member 300 comprising two pivotally coupled plates is mounted to a cross member 380 near the rear end of chassis 100 and to the hopper body 140. The stabilizer member 300 controls undesirable lateral movements of the hopper body 140 during upward and downward movements. The stabilizer member 300 is generally positioned along the longitudinal centerlines of the chassis 100 and the hopper body 140. The stabilizer member 300 comprises a hinged plate with one end 310 coupled to the chassis 100 and the opposite end 320 coupled to the bottom of the hopper body 140. In operation, when the hydraulic cylinder rods 265 extend to lift or elevate the hopper body 140, the stabilizer member 300 extends upwards from the chassis 100 from a flat folded configuration to a generally vertical planar configuration. It is to be understood that other lift and stabilizer arrangements to elevate the hopper body 140 may be employed without departing from the scope of the invention. For example, any one of the following arrangements may be utilized: a single lift assembly for lifting and lowering the hopper body 140, multiple stabilizer arrangements, or stabilizers integrated with lift actuators into a single assembly.

As shown in FIGS. 1, 3, 4, 5, 6, 10 and 11 the transport vehicle 10 includes an external endless throw conveyor 330 adapted to move between a transport or stored position at the side of hopper body 140 and a discharge position below chute 200. The throw conveyor 330 is driven by a direct drive hydraulic motor 335 to drive and regulate its speed. Different propulsion means are known in the art and include but are not limited to chain drives, electric drive motors, and direct hydraulic motors. A swing arm linkage comprised of a connection arm and pivot means at opposite ends thereof links the throw conveyor 330 to the chassis 100. The throw conveyor 330 is coupled at one end to a pivot pin 340 adapted to pivot about a substantially horizontal axis. The pivot pin 340 is coupled to pivot assembly 350 adapted to pivot about a substantially vertical axis. Slewing gear drives, worm drives, rotary actuators, linkage arms and hydraulic cylinders, or other pivot means that can safely hold radial and axial loads, may be used for pivot assembly 350. The pivot assembly 350 is coupled to a connection arm 360 at one end thereof. A pivot pin 370 pivotally mounts connection arm 360 at its opposite end to a cross member 380 of chassis 100. A hydraulic ram 390 is mounted to one side 395 of connection arm 360 and at its opposite end is mounted (not shown) to cross member 380 of the chassis 100. In operation, extending and retracting hydraulic ram 390 rotates connection arm 360 about pin 370 in the directions shown by designations A. When the throw conveyer 330 is in its stored position beside hopper body 140, the connection arm 360 is flush against cross member 380 of the chassis 100. In operation, pivot assembly 350 rotates conveyor 330 about a vertical axis in the directions shown by designations B. A hydraulic cylinder 400 is coupled to the underside of throw conveyor 330 at one end and to connection arm 360 at the opposite end. In operation, extending and retracting hydraulic cylinder rod 405 increases and decreases the incline angle of throw conveyor 330. Accordingly, the throw conveyor 330 can directionally discharge material received from the discharge end of conveyor 150 of hopper body 140 to a site location substantially distant from vehicle 10 by rotating throw conveyor 330 through an arced horizontal path, by increasing and decreasing the incline angle of throw conveyor 330 and controlling the speed of the throw conveyor 330.

Figure 11:
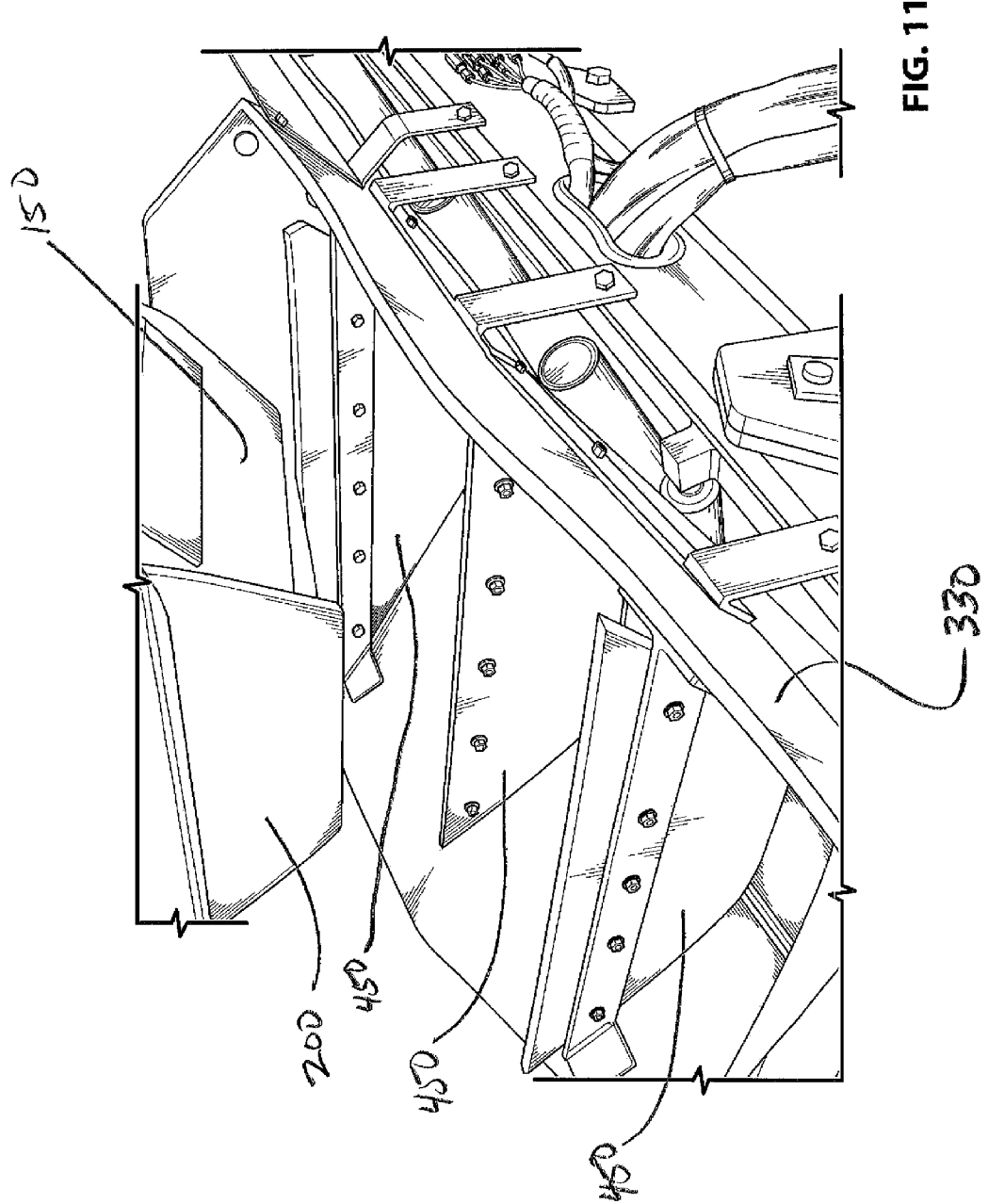
FIG. 11 is a view of a discharge chute over the throw conveyor.

In the exemplary embodiment and referring to FIG. 11, multiple spaced apart divider plates 450 are mounted across the receiving end of throw conveyor 330 for regulating the flow of material discharging from internal conveyor 150 onto the throw conveyor 330. The throw conveyor 330 is provided with a hooded cover section 460 adjacent the divider plates 450 and two material hold down arrangements 470 to hold material on the throw conveyor 330 during discharge. These arrangements prevent discharging material from being scattered from the throw conveyor 330 prematurely, thereby improve the efficiency of the discharge operation and well as the safety of persons in the vicinity of the throw conveyor 330.

To unload material from the hopper body 140 as a slinger truck, the truck operator (using a remote controller or the truck mounted controller) elevates the hopper body 140. Once raised, the swing arm linkage assembly is actuated to pivot the throw conveyor 330 from the stored position at the side of the hopper body 140 to an operational discharge position behind and below the elevated hopper body 140. The tailgate door 190 is opened and the internal conveyor 150 and throw conveyor 330 are actuated with motor 335 and 151, respectively. Material in hopper body 140 flows to the longitudinal output area and conveyor 150, which moves the material from hopper body 140 rearward and through open tailgate door 190. The material drops through chute 200 onto the throw conveyor 330. By operation of the pivot assembly 350 and the operation of hydraulic cylinder 400, the throw conveyor 330 may be moved in an arced path along a horizontal plane and inclined to direct the discharging material towards desired discharge areas. Discharging materials may be directed to various distant points behind the vehicle by varying the path, angle and speed of the throw conveyor.

When material from hopper body 140 does not need to be directionally discharged to a distant location the vehicle can operate similar to a live bottom trailer. The throw conveyor 330 can remain in its stored position beside the hopper body 140, whilst material is unloaded from the hopper body 140 by opening the tailgate door 190 and using the internal conveyor 150 alone. The hopper body 140 may be in a lowered or elevated position during discharge. Offload times can be less than 60 seconds.

Figure 8:
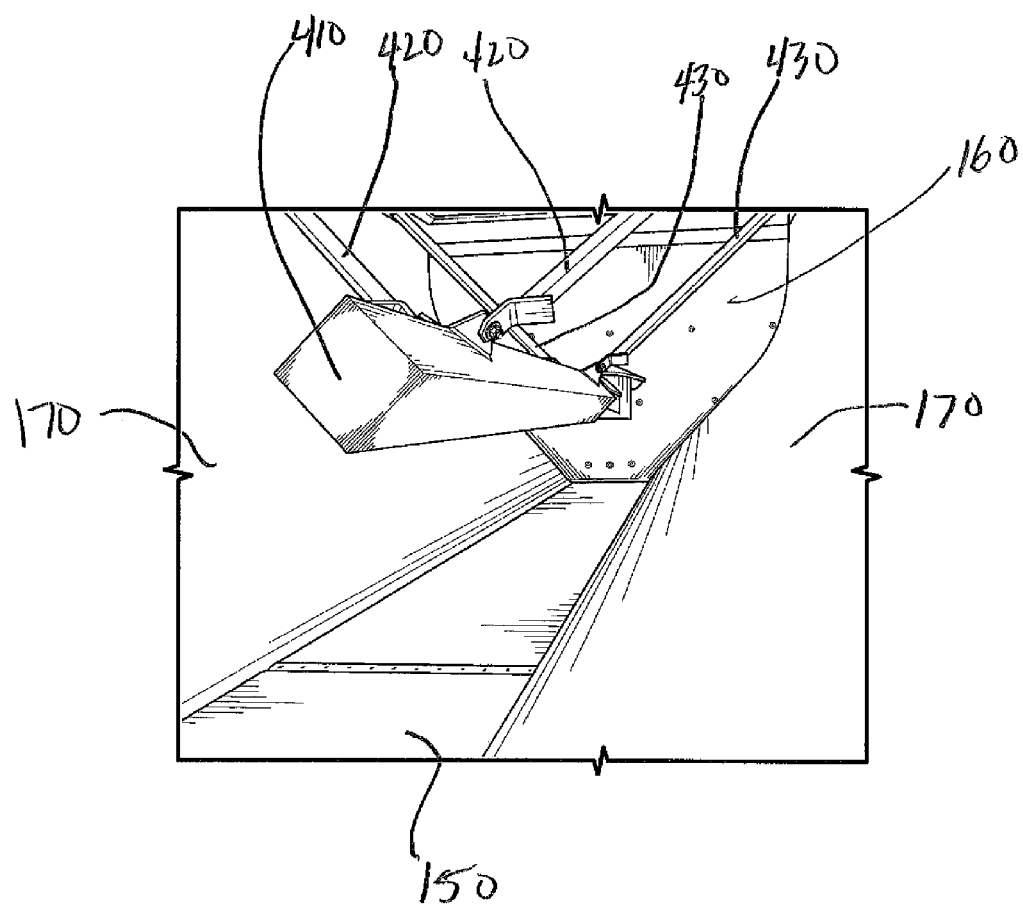
FIG. 8 is an end perspective view of part of the hopper body with a longitudinal metering beam.
Figure 9:
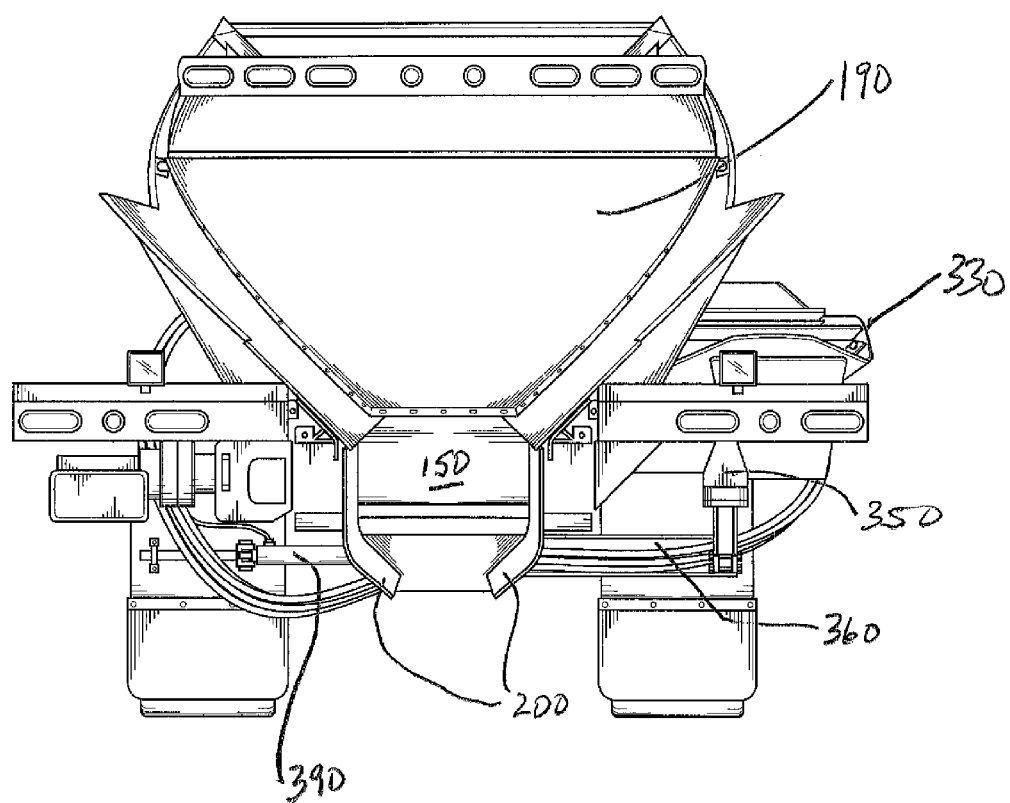
FIG. 9 is a rear view of the vehicle shown in FIG. 1.
Figure 10:
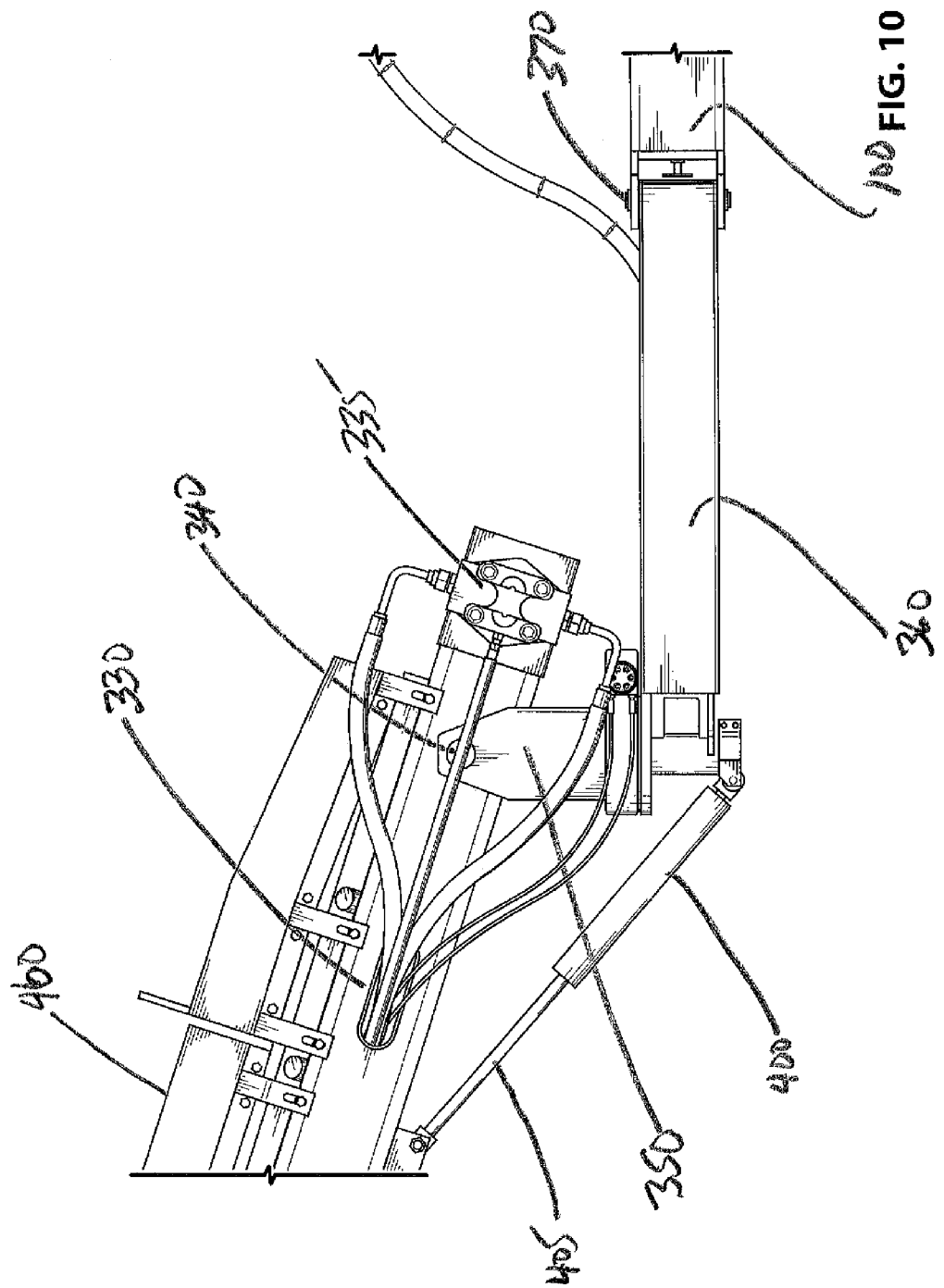
FIG. 10 is an enlarged closer view of the throw conveyor connection to the vehicle chassis.
Figure 12:
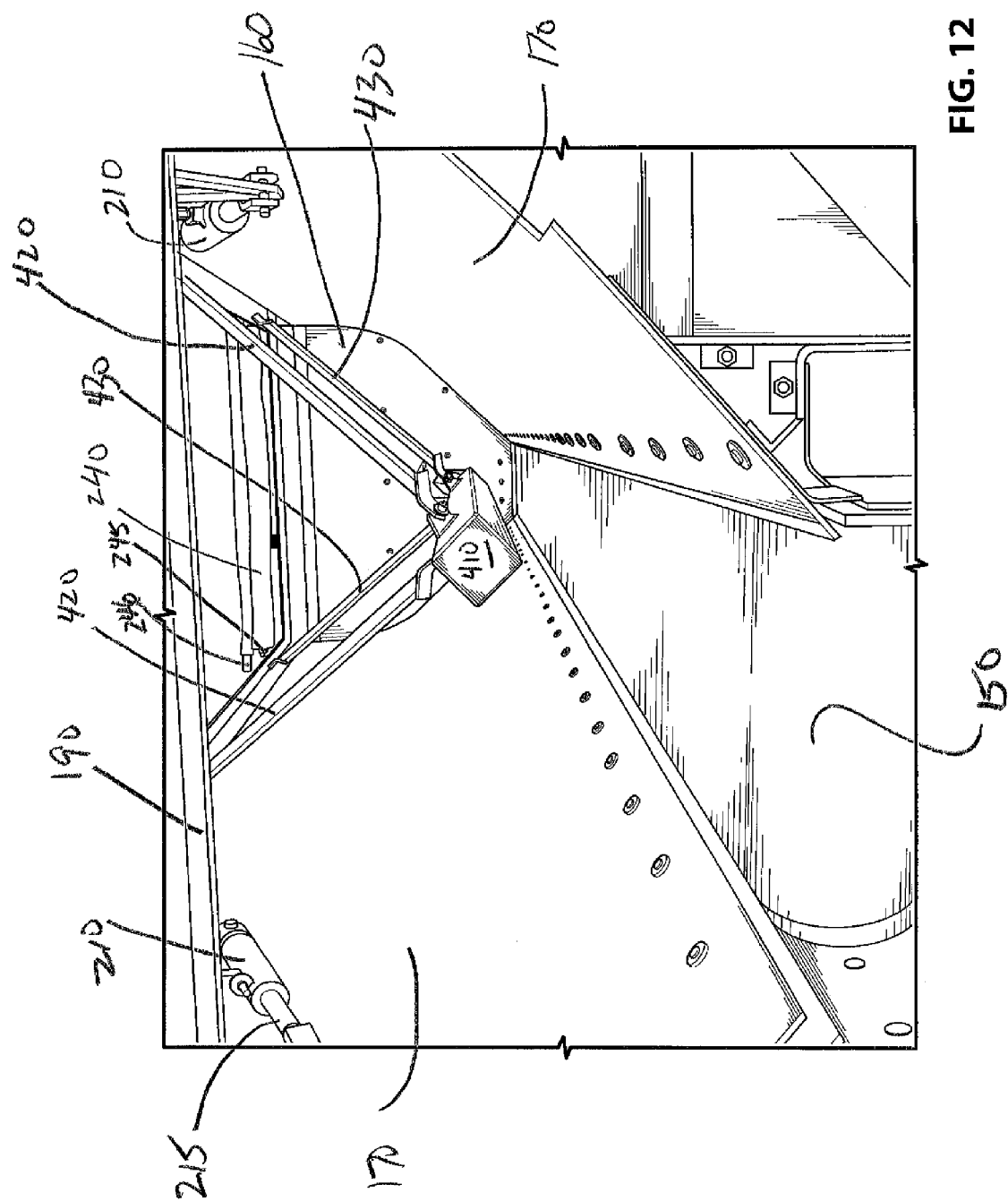
FIG. 12 is another end view of a longitudinal metering beam in the hopper body.
Figure 13:
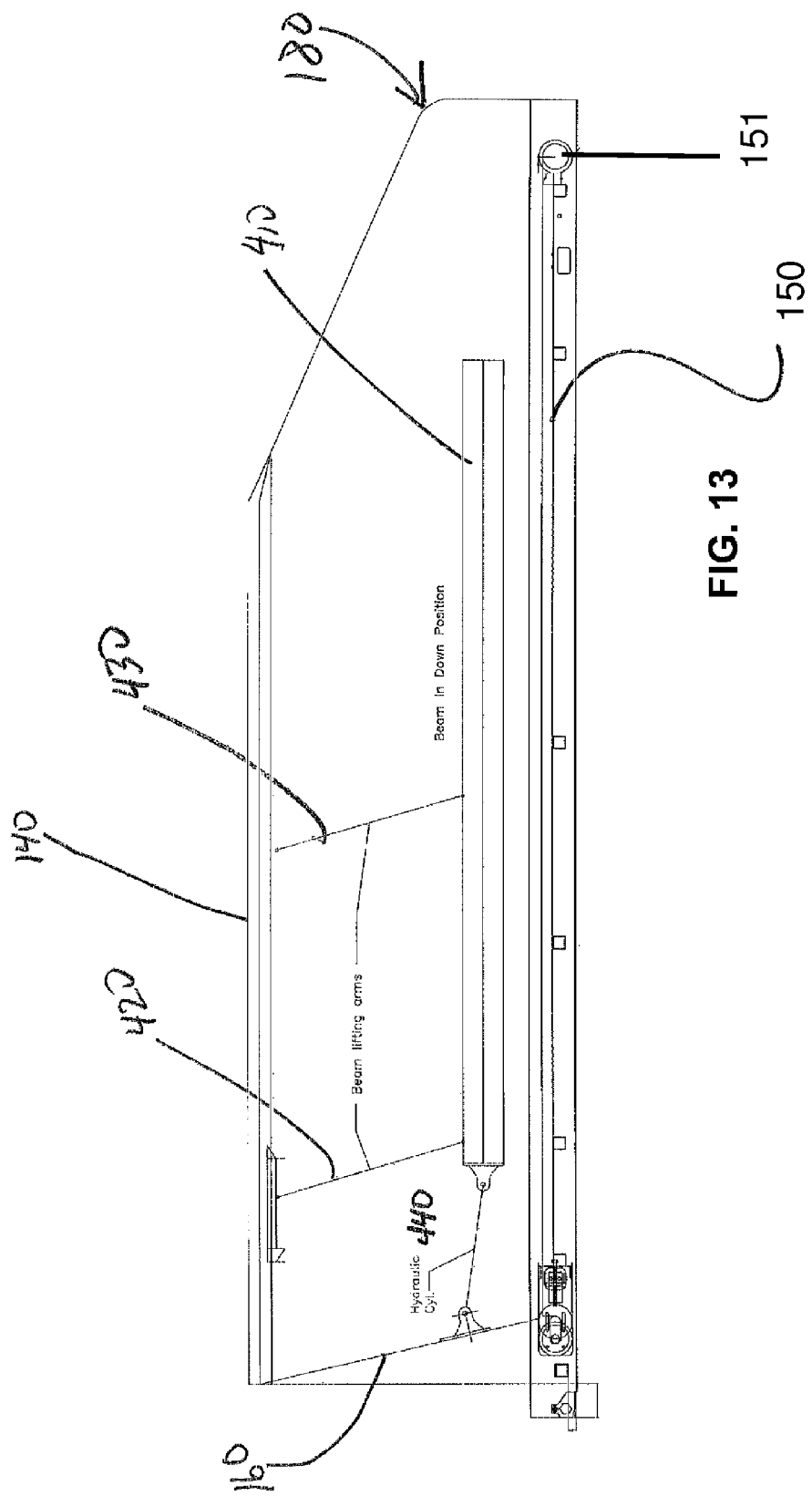
FIG. 13 is a schematic drawing showing a cross sectional view of the hopper body with the metering beam in a down position.

As shown in FIGS. 8, 12, 13 and 14, a metering beam 410 is positioned in hopper body 140 above the conveyor 150. The metering beam 410 is quadrangular in cross section and is suspended above the internal conveyor by a first pair of pivotal support arms 420 proximate one end and second pair of pivotal support arms 430 proximate the opposite end. As shown in FIGS. 8 and 12, the metering beam 410 is suspended from support arms 420 and 430 such that two corner edges of the beam are spatially disposed perpendicular to the conveyor 150. The support arms 420 and 430 are operatively coupled to sidewalls 170. In its lowered position the metering beam 410 runs longitudinally in the hopper body 140 about 10 to 12 inches (25.4 to 30.48 centimeters) above the conveyor 150. One end of a hydraulic cylinder 440 is coupled proximate the lower part of front wall 160 and the opposite end of hydraulic cylinder 440 is coupled to the front end of metering beam 410. A shield (not shown) is provided over the hydraulic cylinder 440 to protect it from the material in the hopper body 140. When hydraulic cylinder 440 is actuated to extend, a force is applied to the front end of metering beam 410 causing it to move rearward in the hopper body 140 which causes the support arms 420 and 430 to swing towards the rear of hopper body 140 resulting in the entire length of the metering beam 410 being elevated through material contained in the hopper body 140. This action effectively lifts a portion of the material and allows compacted material to be loosened and fall down towards the conveyor 150. The metering beam 410 also allows for a smooth and even flow of material to exit the hopper body 140 on the conveyor 150. When the metering beam 410 is fully raised a maximum unload flow rate is achieved. Elevation of metering beam 410 also serves to separate material prone to clumping. In the preferred embodiment of this invention, the metering beam 46 may be elevated approximately 36 to 40 inches (19.44 to 101.6 centimeters from the conveyor 150. Depending on the type of material, elevation of 40 inches (101.6 centimeters) may not be required for full and complete flow of the aggregate material to conveyor 150.

It will be apparent to a person skilled in the art that either a single-acting hydraulic cylinder or a dual-acting hydraulic cylinder may used to elevate and lower the metering beam. It will also be apparent to a person skilled in the art that other means of elevating the metering beam are available.

Although the embodiment illustrated in the drawings and described above reference a vehicle, the present invention maybe fabricated as a stand-alone trailer adapted to be mobilized by a vehicle.

The foregoing descriptions of embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A vehicle for transporting and unloading material comprising:
    a chassis;
    a material hopper body operatively coupled to the chassis;
    a first endless conveyor disposed adjacent a bottom of said material hopper body and driven with a first propulsion means;
    lift means proximate a discharge end of the material hopper body operable to elevate the discharge end of the hopper body and the first conveyor from a horizontal transport position to an inclined unloading position;
    a second endless conveyor driven with a second propulsion means, said second conveyor pivotally mounted to the chassis about a substantially vertical axis and adapted to align with a discharge end of the first conveyor when the material hopper body is in the inclined unloading position and including means for elevating a discharge end of the second conveyor to directionally discharge material from the material hopper body.

2. The vehicle of claim 1, wherein said lift means comprises one or more actuators operatively coupled to the material hopper body and the chassis.

3. The vehicle of claim 2, wherein the one or more actuators are connected to exteriors of sidewalls of said material hopper body.

4. The vehicle of claim 2, wherein the one or more actuators are hydraulic cylinders.

5. The vehicle of claim 1, further comprising a stabilizer member disposed proximate the discharge end of the material hopper body and adapted to extend between an underside of the material hopper body and to the chassis.

6. The vehicle of claim 5, wherein the stabilizer member comprises one or more hinged plates.

7. The vehicle of claim 5, wherein the stabilizer member is spaced from the lift means and generally positioned along a longitudinal centerline of the chassis.

8. The vehicle of claim 1, further comprising a downwardly extending chute adjacent the discharge end of the first conveyor.

9. The vehicle of claim 5, wherein the stabilizer member includes a plate with a first end coupled to the chassis and a second end coupled to the material hopper body, the plate including a hinge between the first and second ends.

10. The vehicle of claim 1, further comprising:
    a metering beam extending longitudinally within said material hopper body above said first conveyor;
    means for elevating said metering beam from a first position proximate said first conveyor, to a second position away from said first conveyor and rearward towards the discharge end of the material hopper body, said elevating means having a hydraulic cylinder acting between said metering beam and said material hopper body, proximate a first end of said metering beam, and including a first pair of support arms suspended from said material hopper body and pivotally mounted proximate the first end and including a second pair of support arms suspended from said material hopper body and pivotally mounted proximate a second end of said metering beam.

11. A material transport apparatus adapted to be mobilized by a vehicle for transporting material, comprising:
    a material hopper body coupled to a chassis supported by wheels of the vehicle such that the material hopper body is adapted to be mobile;
    a first endless conveyor disposed adjacent a bottom of said material hopper body and driven with a first propulsion means;
    the material hopper body including means proximate a discharge end of the hopper body for elevating the discharge end of said material hopper body and the first conveyor from a horizontal transport position to an inclined unloading position; and
    a second endless conveyor driven with a second propulsion means, said second conveyor pivotally mounted to the chassis about a substantially vertical axis and adapted to align with a discharge end of the first conveyor when the material hopper body is in the inclined unloading position, and including means for elevating a discharge end of the second conveyor.

12. The apparatus of claim 11, wherein said means for elevating said material hopper body comprises one or more actuators operatively connected to the material hopper body and the chassis.

13. The apparatus of claim 12, wherein the one or more actuators are connected to exteriors of sidewalls of said material hopper body.

14. The apparatus of claim 12, wherein the one or more actuators are hydraulic cylinders.

15. The apparatus of claim 11, further comprising a stabilizer member disposed proximate the discharge end of the material hopper body and operatively connected to an underside of the material hopper body and to the chassis.

16. The apparatus of claim 15, wherein the stabilizer member comprises one or more hinged plates.

17. The apparatus of claim 15, wherein the stabilizer member is spaced from the means for elevating the material hopper body and generally positioned along a longitudinal centerline of the chassis.

18. The apparatus of claim 11, further comprising a downwardly extending chute adjacent the discharge end of the first conveyor.

19. The apparatus of claim 15, wherein the stabilizer member includes a plate with a first end coupled to the chassis and a second end coupled to the material hopper body, the plate including a hinge between the first and second ends.

20. The apparatus claim 11, further comprising:
a metering beam extending longitudinally within said material hopper body above said first conveyor;
means for elevating said metering beam from a first position proximate said first conveyor, to a second position away from said first conveyor and towards the discharge end of the material hopper body, said elevating means having a hydraulic cylinder acting between said metering beam and said material hopper body, proximate a first end of said metering beam, and including a first pair of support arms suspended from said material hopper body and pivotally mounted proximate the first end and a second pair of support arms suspended from said material hopper body and pivotally mounted proximate a second end of said metering beam.

21. A system for discharging material from a vehicle having a chassis, said system comprising:
a material hopper body coupled to the vehicle;
a first endless conveyor adjacent a bottom of said material hopper body and driven with a first propulsion means;
lift means proximate a discharge end of the material hopper body operable to elevate the discharge end of the material hopper body and the first conveyor from a generally horizontal transport position to an inclined unloading position; and
a second endless conveyor driven with a second propulsion means, said second conveyor pivotally mounted to the chassis about a substantially vertical axis and configured to align with a discharge end of the first conveyor when the material hopper body is in the inclined unloading position, and including means for elevating a discharge end of the second conveyor.

22. The system of claim 21, wherein said lift means comprises one or more actuators operatively coupled to the material hopper body and the chassis.

23. The system of claim 22, wherein the one or more actuators are connected to exterior sidewalls of the material hopper body.

24. The system of claim 22, wherein the one or more actuators are hydraulic cylinders.

25. The system of claim 21, further comprising a stabilizer member disposed proximate the discharge end of the material hopper body and operatively connected to an underside of the material hopper body and to the chassis.

26. The system of claim 25, wherein the stabilizer member comprises one or more hinged plates.

27. The system of claim 25, wherein the stabilizer member is spaced from the lift means and generally positioned along a longitudinal centerline of the chassis.

28. The system of claim 21, further comprising a downwardly extending chute adjacent the discharge end of the first conveyor.

29. The system of claim 25, wherein the stabilizer member includes a plate with a first end coupled to the chassis and a second end coupled to the material hopper body, the plate including a hinge between the first and second ends.

30. The system of claim 21, further comprising:
a metering beam extending longitudinally within said material hopper body above said first conveyor; and
means for elevating said metering beam from a first position proximate said first conveyor, to a second position away from said first conveyor and rearward towards the discharge end of the material hopper body, said elevating means having a hydraulic cylinder acting between said metering beam and said material hopper body, proximate a first end of said metering beam, and including a first pair of support arms suspended from said material hopper body and pivotally mounted proximate the first end and including a second pair of support arms suspended from said material hopper body and pivotally mounted proximate a second end of said metering beam.

31. An apparatus for transporting and discharging material from a vehicle, said apparatus, comprising:
a chassis;
a material hopper body coupled to the chassis, the material hopper body including a pair of opposing sidewalls converging downwardly and inwardly and extending from a front wall toward a discharge area to define a bottom longitudinal output area, a tailgate door adjacent the discharge area, the material hopper body including an open top defined generally between the front wall, the discharge area, the sidewalls, and the tailgate;
a first endless conveyor positioned generally at the bottom longitudinal output area of the material hopper body and operative to convey material from the material hopper body toward the discharge area;
one or more actuators operatively connected to the material hopper body and said chassis proximate the discharge area of the material hopper body for elevating the discharge end of the material hopper body and the first conveyor from a generally horizontal transport position to an inclined unloading position;
a stabilizer member proximate the discharge area of the material hopper body and adapted to extend between an underside of material hopper body and the chassis;
a second endless conveyor operative to convey material received from the first conveyor, said second conveyor pivotally mounted to the chassis about a substantially vertical axis and configured to align with a discharge end of the first conveyor when the material hopper body is in the inclined unloading position and including means for elevating a discharge end of the second conveyor to directionally discharge material from the material hopper body;
a metering beam extending longitudinally within said material hopper body above said first conveyor; and
means for elevating said metering beam from a first position proximate said first conveyor, to a second position away from said first conveyor and rearward towards the discharge area of the material hopper body, said elevating means having an actuator acting between said metering beam and said material hopper body, proximate a first end of said metering beam, and including a first pair of support arms suspended from said material hopper body and pivotally mounted proximate the first end and a second pair of support arms suspended from said material hopper body and pivotally mounted proximate a second end of said metering beam.

32. The apparatus of claim 31, wherein the one or more actuators for elevating the material hopper body and the means for elevating the metering beam are hydraulic cylinders.

33. The apparatus of claim 31, wherein the stabilizer member comprises one or more hinged plates.

34. The apparatus of claim 31, wherein the stabilizer member is spaced from the one or more actuators and comprises a plate with a first end coupled to the chassis and a second end coupled to the material hopper body.

35. A method of discharging material from a rear end of a live bottom material transport apparatus, the transport apparatus comprising a chassis supporting a material hopper body carrying loose material and supported on wheels such that the material hopper body is adapted to be mobile, a first endless conveyor positioned generally at a bottom longitudinal output area of the material hopper body operative to convey material from the material hopper body toward a discharge end of the material hopper body, the material hopper body including one or more actuators operatively connected to the material hopper body and said chassis proximate the discharge end of the material hopper body for elevating the discharge end of the material hopper body and the first conveyor from a horizontal transport position to an inclined unloading position, a stabilizer member proximate the discharge end of the material hopper body and operatively connected to the material hopper body and to the chassis a tailgate door disposed adjacent the discharge end, a second endless conveyor operative to convey material received from the first conveyor, said second conveyor pivotally mounted to the chassis about a substantially vertical axis and configured to align with and under a discharge end of the first conveyor when the material hopper body is in the inclined unloading position and including means for elevating a discharge end of the second conveyor, a metering beam extending longitudinally within said material hopper body above said first conveyor, means for elevating said metering beam from a first position proximate said first conveyor, to a second position away from said first conveyor and rearward towards the discharge end of the material hopper body, said elevating means having an actuator acting between said metering beam and said material hopper body, proximate a first end of said metering beam, and including a first pair of support arms suspended from said material hopper body and pivotally mounted proximate the first end and a second pair of support arms suspended from said material hopper body and pivotally mounted proximate a second end of said metering beam, the method comprising:

elevating the discharge end of the material hopper body and the first conveyor;

pivoting the second conveyor to align a receiving end of the second conveyor under the discharge end of the first conveyor;

opening the tailgate door;

operating the first conveyor to discharge material rearward from the discharge end of the material hopper body; and operating the second conveyor to directionally discharge material rearward of the apparatus.

36. The method of claim 35, further comprising raising and lowering the metering beam during the discharging of material to effect loosening of material adhering to the material hopper body.

\* \* \* \* \*